(12) United States Patent
Tsushima et al.

(10) Patent No.: US 11,948,747 B2
(45) Date of Patent: Apr. 2, 2024

(54) DIELECTRIC BODY, MULTILAYER CERAMIC CAPACITOR, MANUFACTURING METHOD OF DIELECTRIC BODY, AND MANUFACTURING METHOD OF MULTILAYER CERAMIC CAPACITOR

(71) Applicant: TAIYO YUDEN CO., LTD., Tokyo (JP)

(72) Inventors: Yuji Tsushima, Takasaki (JP); Koichiro Morita, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 70 days.

(21) Appl. No.: 17/831,168

(22) Filed: Jun. 2, 2022

(65) Prior Publication Data

US 2022/0415576 A1 Dec. 29, 2022

(30) Foreign Application Priority Data

Jun. 25, 2021 (JP) .................................. 2021-105342

(51) Int. Cl.
*H01G 4/12* (2006.01)
*C04B 35/468* (2006.01)
(Continued)

(52) U.S. Cl.
CPC ....... *H01G 4/1227* (2013.01); *C04B 35/4682* (2013.01); *C04B 35/62675* (2013.01);
(Continued)

(58) Field of Classification Search
CPC ........ H01G 4/30; H01G 4/012; H01G 4/1227; H01G 4/2325; H01G 4/1209; H01G 4/228;
(Continued)

(56) References Cited

U.S. PATENT DOCUMENTS

2008/0305944 A1* 12/2008 Ueda .................... H01B 3/12
501/137
2011/0019333 A1* 1/2011 Yao ..................... C04B 35/4682
501/137
(Continued)

FOREIGN PATENT DOCUMENTS

JP 2015187969 A 10/2015
JP 2016169130 A 9/2016
(Continued)

*Primary Examiner* — Michael P McFadden
(74) *Attorney, Agent, or Firm* — Law Office of Katsuhiro Arai

(57) ABSTRACT

A dielectric body includes a plurality of crystal grains of which a main component is barium titanate, and an additive including Zr, Eu and Mn. At least one of the plurality of crystal grains has a core-shell structure having a core and a shell. A Zr/Ti atomic concentration ratio is 0.02 or more and 0.10 or less. An Eu/Ti atomic concentration ratio is 0.001 or more and 0.03 or less. A Mn/Ti atomic concentration ratio is 0.005 or more and 0.05 or less. A total atomic concentration of the one or more rare elements is smaller than an atomic concentration of Eu when the dielectric body has the one or more rare earth elements. A median diameter of the plurality of crystal grains is 200 nm or more and 400 nm or less.

6 Claims, 9 Drawing Sheets

(51) Int. Cl.
*C04B 35/626* (2006.01)
*H01G 4/008* (2006.01)
*H01G 4/012* (2006.01)
*H01G 4/30* (2006.01)

(52) U.S. Cl.
CPC ............ *H01G 4/008* (2013.01); *H01G 4/012* (2013.01); *H01G 4/30* (2013.01)

(58) Field of Classification Search
CPC ........ H01G 4/306; H01G 4/248; H01G 11/32; H01G 11/04; H01G 11/10; H01G 11/28; H01G 11/46; H01G 11/66; C04B 37/001; C04B 2237/348; H01M 12/00; Y02E 60/13; Y02T 10/70

See application file for complete search history.

(56) References Cited

U.S. PATENT DOCUMENTS

| | | | |
|---|---|---|---|
| 2011/0019336 A1* | 1/2011 | Fukuda | C04B 35/465 501/137 |
| 2011/0094416 A1* | 4/2011 | Kawai | C09C 3/12 204/157.43 |
| 2013/0222968 A1* | 8/2013 | Koga | H01G 4/1227 501/137 |
| 2016/0268045 A1 | 9/2016 | Kaneko et al. | |
| 2017/0287635 A1* | 10/2017 | Sakurai | H01G 4/012 |
| 2018/0122993 A1* | 5/2018 | Camras | H01L 33/00 |
| 2018/0130601 A1* | 5/2018 | Kim | C04B 35/62805 |
| 2019/0237254 A1 | 8/2019 | Sakurai et al. | |
| 2020/0258684 A1* | 8/2020 | Yun | H01G 4/228 |
| 2020/0303125 A1* | 9/2020 | Tsuru | B32B 18/00 |
| 2021/0383973 A1* | 12/2021 | Matsumoto | H01G 4/1227 |

FOREIGN PATENT DOCUMENTS

| | | |
|---|---|---|
| JP | 2017114751 A | 6/2017 |
| JP | 2018090458 A | 6/2018 |
| JP | 2019131438 A | 8/2019 |

* cited by examiner

DIELECTRIC BODY, MULTILAYER CERAMIC CAPACITOR, MANUFACTURING METHOD OF DIELECTRIC BODY, AND MANUFACTURING METHOD OF MULTILAYER CERAMIC CAPACITOR

CROSS-REFERENCE TO RELATED APPLICATION

This application is based upon and claims the benefit of priority of the prior Japanese Patent Application No. 2021-105342, filed on Jun. 25, 2021, the entire contents of which are incorporated herein by reference.

FIELD

A certain aspect of the present disclosure relates to a dielectric body, a multilayer ceramic capacitor, a manufacturing method of the dielectric body, and a manufacturing method of the multilayer ceramic capacitor.

BACKGROUND

In a high frequency communication system in which a mobile phone acts as a representative role, multilayer ceramic capacitors are being used in order to remove noise. In an electronic circuit related with a life of a human such as an electronic controller apparatus mounted on a vehicle, the multilayer ceramic capacitors are being used. High reliability of the multilayer ceramic capacitors is requested. Therefore, technologies for improving the reliability are disclosed (for example, see Japanese Patent Application Publications No. 2017-114751, No. 2018-90458, No. 2019-131438, No. 2016-169130, and No. 2015-187969).

SUMMARY OF THE INVENTION

According to a first aspect of the embodiments, there is provided a dielectric body including: a plurality of crystal grains of which a main component is barium titanate; and an additive including Zr, Eu and Mn, wherein at least one of the plurality of crystal grains has a core-shell structure having a core and a shell, a main component of the core being barium titanate, a main component of the shell being barium titanate, a Zr concentration of the shell being higher than that of the core, wherein a Zr/Ti atomic concentration ratio is 0.02 or more and 0.10 or less, wherein an Eu/Ti atomic concentration ratio is 0.001 or more and 0.03 or less, wherein a Mn/Ti atomic concentration ratio is 0.005 or more and 0.05 or less, wherein the dielectric body has one or more rare earth elements other than Eu, or does not have any rare earth element other than Eu, wherein a total atomic concentration of the one or more rare elements is smaller than an atomic concentration of Eu when the dielectric body has the one or more rare earth elements, wherein a median diameter of the plurality of crystal grains is 200 nm or more and 400 nm or less.

According to a second aspect of the embodiments, there is provided a multilayer ceramic capacitor including: a multilayer structure having a structure in which each of a plurality of dielectric layers and each of a plurality of internal electrode layers are alternately stacked and having a substantially rectangular parallelepiped shape, wherein each of the plurality of internal electrode layers are alternately exposed to each of two different faces of the rectangular parallelepiped shape, wherein a section in which internal electrode layers exposed to the two different faces face each other is a capacity section, wherein dielectric layers in the capacity section have a plurality of crystal grains of which a main component is barium titanate and an additive including Zr, Eu and Mn, wherein at least one of the plurality of crystal grains has a core-shell structure having a core and a shell, a main component of the core being barium titanate, a main component of the shell being barium titanate, a Zr concentration of the shell being higher than that of the core, wherein a Zr/Ti atomic concentration ratio of the dielectric layers in the capacity section is 0.02 or more and 0.10 or less, wherein an Eu/Ti atomic concentration ratio of the dielectric layers in the capacity section is 0.001 or more and 0.03 or less, wherein a Mn/Ti atomic concentration ratio of the dielectric layers in the capacity section is 0.005 or more and 0.05 or less, wherein the dielectric layers in the capacity section has one or more rare earth elements other than Eu, or does not have any rare earth element other than Eu, wherein a total atomic concentration of the one or more rare elements is smaller than an atomic concentration of Eu when of the dielectric layers in the capacity section has the one or more rare earth elements, wherein a median diameter of the plurality of crystal grains is 200 nm or more and 400 nm or less.

According to a third aspect of the embodiments, there is provided a manufacturing method of a dielectric body including: forming a dielectric body by firing a dielectric green sheet at a temperature elevation rate of 5000° C./h or more and 10000° C./h or less, wherein the dielectric green sheet includes barium titanate powder and an additive including Zr, Eu and Mn, wherein a Zr/Ti atomic concentration ratio in the dielectric green sheet is 0.02 or more and 0.10 or less, wherein an Eu/Ti atomic concentration ratio in the dielectric green sheet is 0.001 or more and 0.03 or less, wherein a Mn/Ti atomic concentration ratio in the dielectric green sheet is 0.005 or more and 0.05 or less, wherein the dielectric green sheet has one or more rare earth elements other than Eu, or does not have any rare earth element other than Eu, wherein a total atomic concentration of the one or more rare elements in the dielectric green sheet is smaller than an atomic concentration of Eu in the dielectric green sheet when the dielectric green sheet has the one or more rare earth elements, wherein the dielectric body includes a plurality of crystal grains of which a main component is barium titanate, wherein a median diameter of the plurality of crystal grains is 200 nm or more and 400 nm or less.

According to a fourth aspect of the embodiments, there is provided a manufacturing method of a multilayer ceramic capacitor including: forming a ceramic multilayer structure by stacking stack units in which metal conductive paste is printed on a dielectric green sheet including barium titanate powder and an additive including Zr, Eu and Mn; and firing the ceramic multilayer structure at a temperature elevation rate of 5000° C./h or more and 10000° C./h or less so that dielectric layer are formed from the dielectric green sheet, wherein a Zr/Ti atomic concentration ratio in the dielectric green sheet is 0.02 or more and 0.10 or less, wherein an Eu/Ti atomic concentration ratio in the dielectric green sheet is 0.001 or more and 0.03 or less, wherein a Mn/Ti atomic concentration ratio in the dielectric green sheet is 0.005 or more and 0.05 or less, wherein the dielectric green sheet has one or more rare earth elements other than Eu, or does not have any rare earth element other than Eu, wherein a total atomic concentration of the one or more rare elements in the dielectric green sheet is smaller than an atomic concentration of Eu in the dielectric green sheet when the dielectric green sheet has the one or more rare earth elements, wherein the dielectric layers includes a plurality of crystal grains of which a main component is barium titanate, wherein a median diameter of the plurality of crystal grains is 200 nm or more and 400 nm or less.

DETAILED DESCRIPTION

A sintered body having a core-shell structure is being used as a dielectric body of the multilayer ceramic capacitors. The core-shell structure has a structure in which a core made of barium titanate is surrounded by a shell into which each additive is solid-solved. This is because excellent temperature characteristic is obtained and a stable micro structure is obtained in a firing process. Mg (magnesium) is a representative example of an additive structuring the shell. However, Mg is a simple acceptor of which a valence is unchangeable. Mg forms an oxygen vacancy having a bad influence on the reliability of the multilayer ceramic capacitors, because of electrical neutrality condition. Therefore, reliability is not sufficiently improved in a usage under the high reliability.

Next, in the usage under high reliability, it is favorable that the multilayer ceramic capacitors can be used at a high temperature until 150° C. However, the Curie point of barium titanate acting as a main component of the dielectric layers is approximately 125° C. The capacity may be largely reduced at a temperature higher than the Curie point. Therefore, if there is no special contrivance, the temperature characteristic X8R (the capacity changing rate from −55° C. to 150° C. from a capacity at 25° C. is within ±15%) of EIA standard may not be necessarily achieved. As an improving method, it is thought that the X8R characteristic is satisfied by adding Yb (ytterbium) to the dielectric layers and shifting the Curie point to a higher temperature side. However, Yb acts as an acceptor. Sufficient reliability may not be necessarily achieved with respect to the usage under the high reliability, as well as Mg. There is a method of mixing $BaTiO_3$ with $BaTi_2O_5$ of which the Curie point is high (470° C.). However, a relative dielectric constant at a room temperature of $BaTi_2O_5$ is low. Therefore, a high capacity may not be necessarily achieved.

Hereinafter, an exemplary embodiment will be described with reference to the accompanying drawings.

[Exemplary Embodiment]

Figure 1:
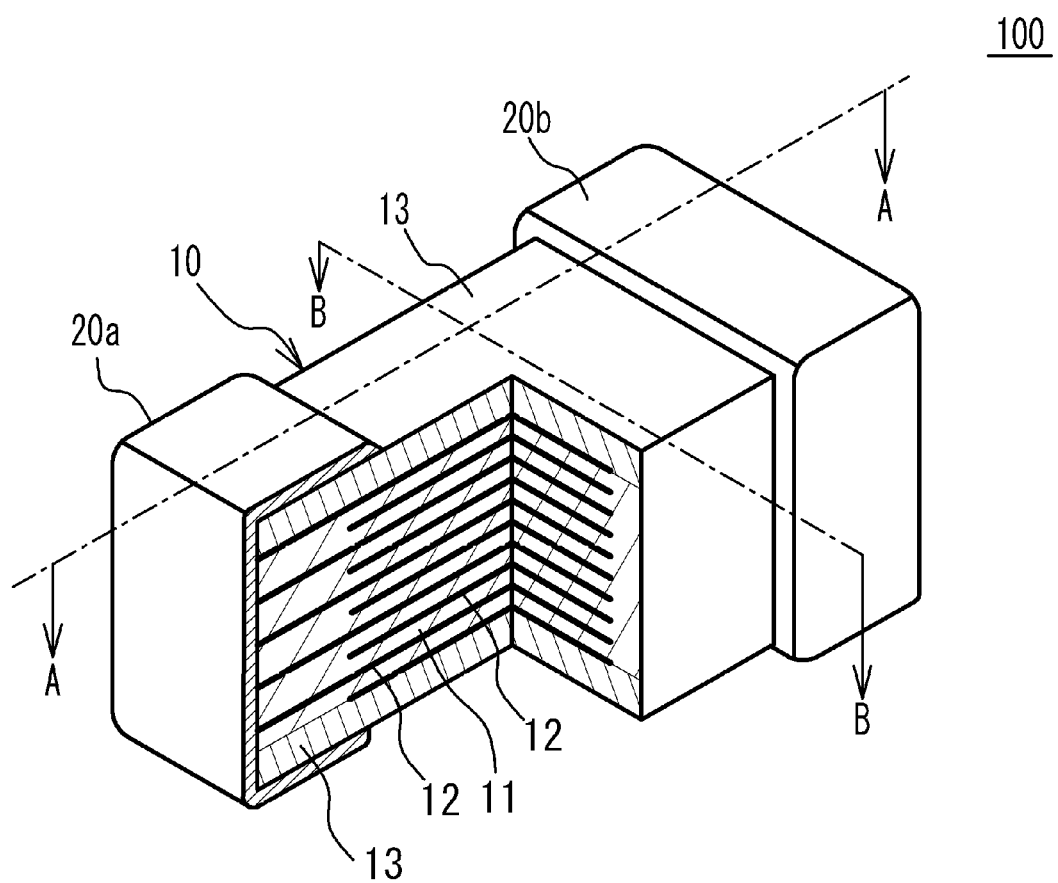
FIG. 1 is a partial cross-sectional perspective view of a multilayer ceramic capacitor.
Figure 2:
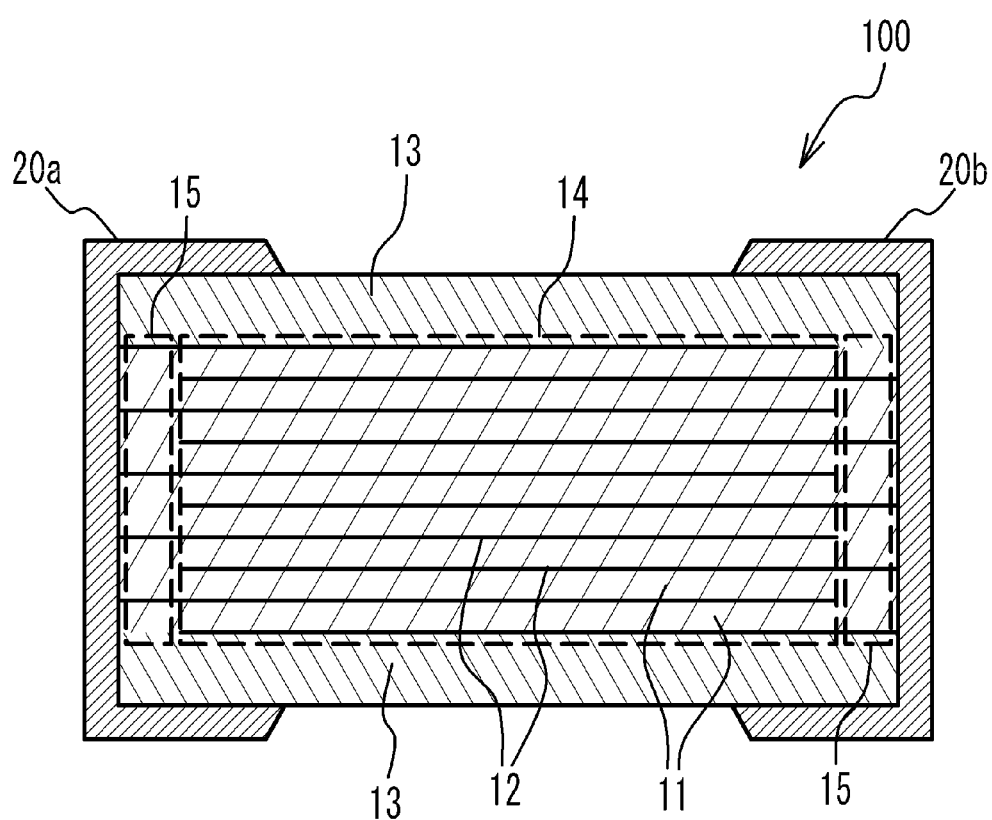
FIG. 2 is a cross-sectional view taken along line A-A in FIG. 1.
Figure 3:
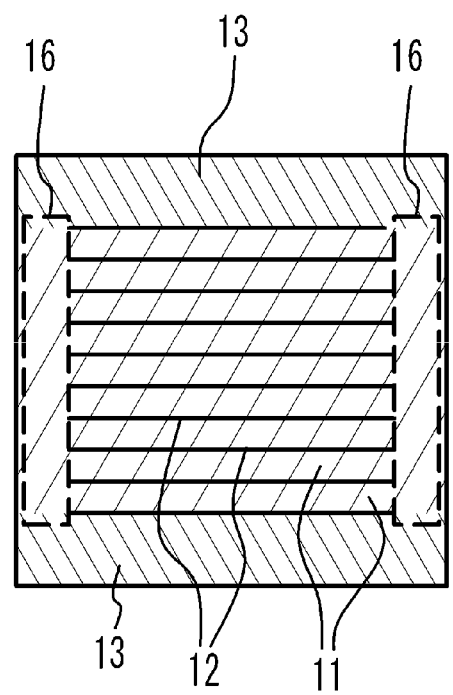
FIG. 3 is a cross-sectional view taken along line B-B in FIG. 1.

FIG. 1 illustrates a perspective view of a multilayer ceramic capacitor 100 in accordance with an embodiment, in which a cross section of a part of the multilayer ceramic capacitor 100 is illustrated. FIG. 2 is a cross-sectional view taken along line A-A in FIG. 1. FIG. 3 is a cross-sectional view taken along line B-B in FIG. 1. As illustrated in FIG. 1 to FIG. 3, the multilayer ceramic capacitor 100 includes a multilayer chip 10 having a rectangular parallelepiped shape, and external electrodes 20a and 20b that are respectively provided on two edge faces of the multilayer chip 10 facing each other. Among four faces other than the two edge faces of the multilayer chip 10, two faces other than the top face and the bottom face in the stack direction are referred to as side faces. Each of the external electrodes 20a and 20b extends to the top face and the bottom face in the stack direction and the two side faces of the multilayer chip 10. However, the external electrodes 20a and 20b are spaced from each other.

The multilayer chip 10 has a structure designed to have dielectric layers 11 and internal electrode layers 12 alternately stacked. The dielectric layer 11 contains a ceramic material acting as a dielectric material. End edges of the internal electrode layers 12 are alternately exposed to a first end face of the multilayer chip 10 and a second end face of the multilayer chip 10 that is different from the first end face. The external electrode 20a is provided on the first end face. The external electrode 20b is provided on the second end face. Thus, the internal electrode layers 12 are alternately electrically connected to the external electrode 20a and the external electrode 20b. Accordingly, the multilayer ceramic capacitor 100 has a structure in which a plurality of the dielectric layers 11 are stacked with the internal electrode layers 12 interposed therebetween. In the multilayer structure of the dielectric layers 11 and the internal electrode layers 12, the outermost layers in the stack direction are the internal electrode layers 12, and cover layers 13 cover the top face and the bottom face of the multilayer structure. The cover layer 13 is mainly composed of a ceramic material. For example, the main component of the cover layer 13 is the same as the main component of the dielectric layer 11. The structure is not limited to FIG. 1 to FIG. 3, when each of the internal electrode layers 12 is exposed to each of two different faces and is connected to each of two different external electrodes.

For example, the multilayer ceramic capacitor 100 may have a length of 0.25 mm, a width of 0.125 mm, and a height of 0.125 mm. The multilayer ceramic capacitor 100 may have a length of 0.4 mm, a width of 0.2 mm, and a height of 0.2 mm. The multilayer ceramic capacitor 100 may have a length of 0.6 mm, a width of 0.3 mm, and a height of 0.3 mm. The multilayer ceramic capacitor 100 may have a length of 1.0 mm, a width of 0.5 mm, and a height of 0.5 mm. The multilayer ceramic capacitor 100 may have a length of 3.2 mm, a width of 1.6 mm, and a height of 1.6 mm. The multilayer ceramic capacitor 100 may have a length of 4.5 mm, a width of 3.2 mm, and a height of 2.5 mm. However, the size of the multilayer ceramic capacitor 100 is not limited to the above sizes.

The internal electrode layer 12 is mainly composed of a base metal such as nickel (Ni), copper (Cu), or tin (Sn). The internal electrode layer 12 may be composed of a noble metal such as platinum (Pt), palladium (Pd), silver (Ag), or gold (Au) or alloy including one or more of them. The thickness of each of the internal electrode layers 12 may be 0.1 μm or more and 3 μm or less, 0.1 μm or more and 1 μm or less, or 0.1 μm or more and 0.5 μm or less.

The dielectric layer 11 is mainly composed of a ceramic material having a perovskite structure expressed by a general formula $ABO_3$. The perovskite structure includes $ABO_{3-\alpha}$ having an off-stoichiometric composition. In the embodiment, an A site of the ceramic material includes at least Ba (barium), and a B site of the ceramic material includes at least Ti (titanium). The B site may include Zr (zirconium). The thickness of each of the dielectric layers 11 may be 0.2 μm or more and 10 μm or less, 0.2 μm or more and 5 μm or less, or 0.2 μm or more and 2 μm or less.

As illustrated in FIG. 2, the section where the internal electrode layer 12 connected to the external electrode 20a faces the internal electrode layer 12 connected to the external electrode 20b is a section where capacity is generated in the multilayer ceramic capacitor 100. Thus, this section is referred to as a capacity section 14. That is, the capacity section 14 is a section where two adjacent internal electrode layers 12 connected to different external electrodes face each other.

The section where the internal electrode layers 12 connected to the external electrode 20a face each other with no internal electrode layer 12 connected to the external electrode 20b interposed therebetween is referred to as an end margin 15. The section where the internal electrode layers 12 connected to the external electrode 20b face each other with no internal electrode layer 12 connected to the external electrode 20a interposed therebetween is also the end margin 15. That is, the end margin 15 is a section where the internal electrode layers 12 connected to one of the external electrodes face each other with no internal electrode layer 12 connected to the other of the external electrodes interposed therebetween. The end margin 15 is a section where no capacity is generated.

As illustrated in FIG. 3, in the multilayer chip 10, the section from each of the two side faces of the multilayer chip 10 to the internal electrode layers 12 is referred to as a side margin 16. That is, the side margin 16 is a section that covers each of the edges, extending toward the respective side faces of the multilayer structure, of the stacked internal electrode layers 12. The side margin 16 is a section where no capacity is generated.

When at least a part of crystal grains of barium titanate of the dielectric layers 11 in the capacity section 14 of the multilayer ceramic capacitor 100 has a core-shell structure, the dielectric layers 11 in the capacity section 14 have a high dielectric constant and excellent temperature characteristic. In this case, stable micro structures coexist.

For example, Mg acts as a representative additive structuring the shell. However, Mg is a simple acceptor of which valence is constant. When Mg is solid-solved in barium titanate of the dielectric layers 11, an oxygen vacancy is formed. Therefore, improvement of the reliability may be difficult.

Accordingly, in the embodiment, at least a part of the crystal grains of barium titanate of the dielectric layers 11 in the capacity section 14 has a core-shell structure in which barium titanate acts as a core and a layer to which Zr (zirconium) is diffused acts as a shell. A main component of the shell is barium titanate.

Figure 4A:
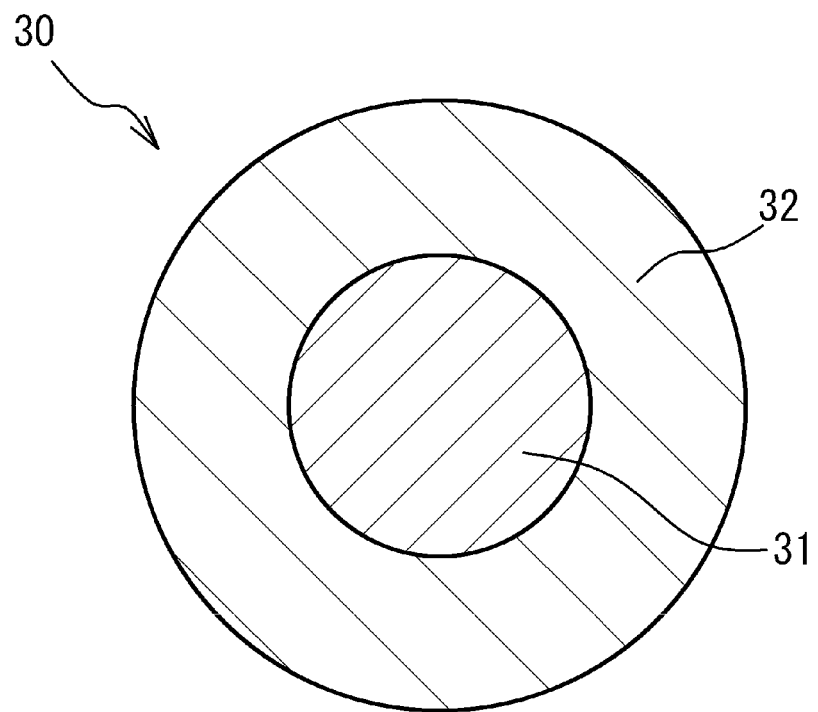
FIG. 4A illustrates a core-shell grain.

As illustrated in FIG. 4A, a core-shell grain 30 has a core 31 having a spherical shape and a shell 32 covering and surrounding the core 31. The core 31 is a crystal portion in which no additive compound is solid-solved or an amount of solid-solved additive compound is small. The shell 32 is a crystal portion in which an additive compound is solid-solved. And a concentration of an additive compound of the shell 32 is higher than that of the core 31. In the embodiment, the concentration of Zr in the shell 32 is higher than that of the core 31. Alternatively, Zr is diffused into the shell 32, and Zr is not diffused into the core 31.

Figure 4B:
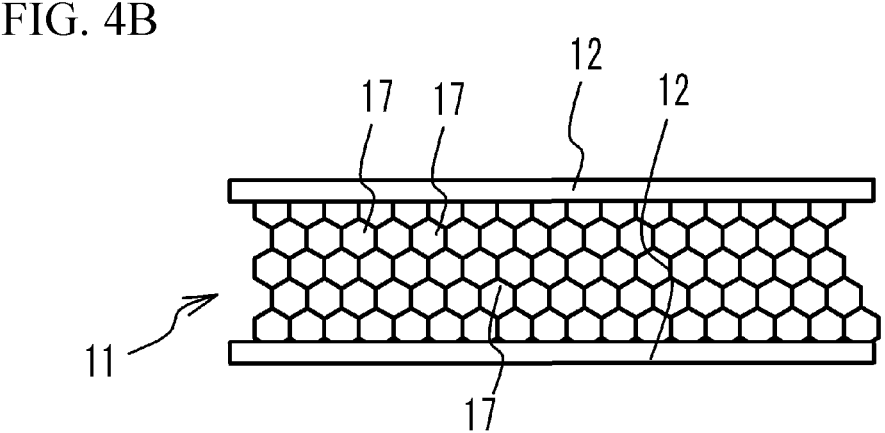
FIG. 4B schematically illustrates a cross section of a dielectric layer.

FIG. 4B schematically illustrates a cross section of the dielectric layer 11. As illustrated in FIG. 4B, the dielectric layer 11 includes a plurality of crystal grains 17 of the main component ceramic. At least a part of the crystal grains 17 is the core-shell grain 30 described on the basis of FIG. 4A. When the shell 32 having a high Zr concentration and having high resistance to reduction is covered by the core 31, high dielectric constant is remained and a stable structure is achieved. And, a highly reliable material is obtained.

When Zr is diffused into barium titanate and solid-solved in the barium titanate, Curie temperature of the barium titanate is reduced. Therefore, when the layer into which Zr is diffused is excessively thick, the changing rate of the capacity becomes large at a high temperature. And the X8R property may not be necessarily satisfied in the multilayer ceramic capacitor 100. Generally, Zr is solid-solved in barium titanate and is diffused into the barium titanate. Thereby, rapid grain growth may occur in the barium titanate. It is therefore difficult to achieve the X8R characteristic by limiting the thickness of the diffusion layer and suppressing the grain growth. For example, when the temperature elevation rate in the firing process is approximately 10° C./h, the diffusion of a rare earth element is excessively promoted, and an all solid solution grain is formed. In this case, the solid-solution of Zr and the solid-solution of the rare earth element are promoted. A dielectric constant may become lower, the sintering stability may be degraded and temperature characteristic of the capacity may be degraded, although a long lifetime is achieved. In the embodiment, the diffusion distance of Zr is limited. And, the Zr concentration of the shell 32 is higher than that of the core 31. Therefore, the multilayer ceramic capacitor 100 satisfies the X8R characteristic.

When a Zr/Ti atomic concentration ratio in the dielectric layers 11 in the capacity section 14 is excessively small, the core-shell structure having the core of which the Zr concentration is smaller and the shell of which the Zr concentration is larger may not be necessarily maintained. In this case, a local abnormal growing may occur. And, the long lifetime may not be necessarily achieved. And, the X8R characteristic may not be necessarily achieved. Accordingly, in the embodiment, the Zr/Ti atomic concentration ratio has a lower limit. In concrete, the Zr/Ti atomic concentration ratio in the dielectric layers 11 in the capacity section 14 is 0.02 or more. In this case, the grain diameters of the crystal grains 17 becomes approximately uniform. It is possible to form the stable core-shell structure having element distribution in which the shell 32 has a high concentration of Zr. It is preferable that the Zr/Ti atomic concentration ratio is 0.03 or more. It is more preferable that the Zr/Ti atomic concentration ratio is 0.04 or more.

On the other hand, when the Zr/Ti atomic concentration ratio is excessively large in the dielectric layers 11 in the capacity section 14, the relative dielectric constant of the dielectric layers 11 may be small (for example, 1500 or less). And, the X8R characteristic may not be necessarily satisfied. Accordingly, in the embodiment, the Zr/Ti atomic concentration ratio has an upper limit. In concrete, the Zr/Ti atomic concentration ratio in the dielectric layers 11 in the capacity section 14 is 0.10 or less. In this case, sufficient relative dielectric constant may be achieved. It is preferable that the Zr/Ti atomic concentration ratio is 0.08 or less. It is more preferable that the Zr/Ti atomic concentration ratio is 0.06 or less.

However, when Zr is doped in the dielectric layers 11, a lattice constant of the barium titanate crystal is enlarged and an amount of rare earth elements which are solid-solved in the B site is larger than that in the A site. In this case, an amount of acceptors is excessive. Therefore, the improvement of the life time characteristic is limited. The rare earth elements are such as Ho (holmium), Dy (dysprosium), Y (yttrium) or the like acting an important role in life time characteristic.

Accordingly, the present inventors have studied rare earth elements having a large ionic radius which are easily solid-solved into an A site of barium titanate. The present inventors have found that the lifetime of a case where Eu (europium) is added is more than the lifetime of a case where a rare earth element such as Ho, Dy or Y is added, by one digit or so. The reason why the lifetime is improved by adding Eu is not completely clarified. Eu of which a valence is two and Eu of which the valence is three are stable. The valence of Eu fluctuates between two and three. The ionic radius of Eu of which the valence is two is the largest among stable rare earth ions. Therefore, Eu may tends to be solid-solved into the A site. Rare earth elements other than Eu are stable when the valence of the rare earth elements is three. The rare earth elements are unstable when the valence of the rare earth elements is two.

Table 1 shows ionic radiuses of rare earth elements of which a coordination number is 6. Exhibition of Table 1 is "R. D. Shannon, Acta Crystallogr., A32, 751(1976)".

TABLE 1

| | | IONIC RADIUS(Å) | |
|---|---|---|---|
| | VALENCE | COORDINATION NUMBER IS 6 | COORDINATION NUMBER IS 12 |
| Ba | +2 | | 1.610 |
| Ti | +4 | 0.605 | |
| Eu | +2 | 1.170 | |
| Dy | +2 | 1.070 | |
| La | +3 | 1.032 | |
| Tm | +2 | 1.030 | |
| Yb | +2 | 1.020 | |
| Ce | +3 | 1.010 | |
| Pr | +3 | 0.990 | |
| Nd | +3 | 0.983 | |
| Pm | +3 | 0.970 | |
| Sm | +3 | 0.958 | |
| Eu | +3 | 0.947 | |
| Gd | +3 | 0.938 | |
| Tb | +3 | 0.923 | |
| Dy | +3 | 0.912 | |
| Ho | +3 | 0.901 | |
| Y | +3 | 0.900 | |
| Er | +3 | 0.890 | |
| Tm | +3 | 0.880 | |
| Yb | +3 | 0.868 | |
| Lu | +3 | 0.861 | |
| Sc | +3 | 0.745 | |

Eu is solid-solved easier into the shell 32 than into the core 31. Therefore, a concentration of Eu in the shell 32 is higher than that in the core 31.

When the Eu/Ti atomic concentration ratio in the dielectric layers 11 in the capacity section 14 is excessively small, sufficient lifetime may not be necessarily achieved. Accordingly, in the embodiment, the Eu/Ti atomic concentration ratio has a lower limit. In concrete, the Eu/Ti atomic concentration ratio in the dielectric layers 11 in the capacity section 14 is 0.001 or more. It is preferable that the Eu/Ti atomic concentration ratio is 0.005 or more. It is more preferable that the Eu/Ti atomic concentration ratio is 0.01 or more.

On the other hand, when the Eu/Ti atomic concentration ratio in the dielectric layers 11 in the capacity section 14 is excessively large, a semiconductor may be formed in the dielectric layers 11 and the long lifetime may not be necessarily achieved. Accordingly, in the embodiment, the Eu/Ti atomic concentration ratio has an upper limit. In concrete, the Eu/Ti atomic concentration ratio in the dielectric layers 11 in the capacity section 14 is 0.03 or less. It is preferable that the Eu/Ti atomic concentration ratio is 0.025 or less. It is more preferable that the Eu/Ti atomic concentration ratio is 0.02 or less.

However, when a part of the Eu elements is solid-solved in the A-site, the Eu elements act as donors and insulation characteristic may be degraded. The present inventors have found that adding of Mn (manganese) together with Eu is effective, because Mn decreases the number of excessive electrons. Mn improves the insulation characteristic. In addition, the valence of Mn increases when a re-oxidation process is performed. In this case, the number of oxygen vacancies is reduced, and the lifetime can be improved. All amount of Mg acting as a simple acceptor may be replaced by Mn. A slight amount of Mg may be left in order to limit the grain diameter by the function of Mg. Mn acts as the acceptor, and the amount of Mg is minimized so as to satisfy the structure or other property.

When a Mn/Ti atomic concentration ratio in the dielectric layers 11 in the capacity section 14 is excessively small, the number of the acceptors is small in the dielectric layers 11 and a long lifetime may not necessarily be achieved because of formation of semiconductor in the dielectric layers 11. Accordingly, in the embodiment, the Mn/Ti atomic concentration ratio has a lower limit. In concrete, the Mn/Ti atomic concentration ratio in the dielectric layers 11 in the capacity section 14 is 0.005 or more. It is preferable that the Mn/Ti atomic concentration ratio is 0.01 or more. It is more preferable that the Mn/Ti atomic concentration is 0.02 or more.

On the other hand, when the Mn/Ti atomic concentration ratio is excessively large in the dielectric layers 11 in the capacity section 14, the amount of oxygen vacancies is excessive because of excessive amount of the acceptors and the lifetime may be reduced. Accordingly, in the embodiment, the Mn/Ti atomic concentration ratio has an upper limit. In concrete, the Mn/Ti atomic concentration ratio in the dielectric layers 11 in the capacity section 14 is 0.05 or less. It is preferable that the Mn/Ti atomic concentration ratio is 0.04 or less. It is more preferable that the Mn/Ti atomic concentration ratio is 0.03 or less.

When the additive such as Zr or Mn is solid-solved in barium titanate, the Curie temperature of the barium titanate is shifted to a lower temperature which is lower than 125° C. In this case, the capacity changing rate at a high temperature may be degraded. On the other hand, in the embodiment, the Curie temperature is shifted to a higher temperature which is higher than 125° C. (for example, 130° C.). Therefore, the degradation of the capacity changing rate at a high temperature is suppressed. Thereby, the multilayer ceramic capacitor 100 satisfies the X8R characteristic. The reason why the Curie temperature is shifted to a higher temperature is not clarified. However, it is thought that a part of the Eu elements passes through the shell 32 and is solid-solved in the core 31, the crystal lattice of the core 31 contracts, the crystal lattice of the shell 32 is enlarged by the diffusion of the additive of which the Zr concentration is high, and an internal stress may occur at the interface between the core 31 and the shell 32.

When the crystal grain diameters in the dielectric layers 11 are excessively small or excessively large, the capacity changing rate becomes large. In this case, the X8R characteristic may not be necessarily achieved in the multilayer ceramic capacitor 100. Accordingly, in the embodiment, a median diameter of the crystal grains 17 in the dielectric layers 11 in the capacity section 14 has a lower limit and an upper limit. In concrete, the median diameter of the crystal grains 17 in the dielectric layers 11 in the capacity section 14 is 200 nm or more and 400 nm or less. When the median diameter is within the range, the temperature changing rate at Curie point or more becomes small. It is preferable that the median diameter of the crystal grains 17 in the dielectric layers 11 in the capacity section 14 is 250 nm or more. It is more preferable that the median diameter is 300 nm or more. On the other hand, it is preferable that the median diameter is 375 nm or less. It is more preferable that the median diameter is 350 nm or less.

Next, when the amount of a rare earth element other than Eu is excessively large in the dielectric layers 11 in the capacity section 14, the effect of Eu improving the lifetime may get smaller. And the sufficient lifetime may not be necessarily achieved. Accordingly, in the embodiment, the amount of the rare earth element other than Eu has an upper limit. In concrete, the atomic concentration of the rare earth element other than Eu in the dielectric layers 11 in the capacity section 14 is smaller than the atomic concentration of Eu. When the number of the rare earth elements other than Eu is two or more, the total atomic concentration of the rare earth elements is smaller than the atomic concentration of Eu.

As described above, in the embodiment, at at least one of the crystal grains of the dielectric layers 11 in the capacity section 14 has the core-shell structure having the core 31 and the shell 32. The main component of the core 31 is barium titanate. The main component of the shell 32 is barium titanate. The Zr concentration of the shell 32 is higher than that of the core 31. The Zr/Ti atomic concentration ratio of the dielectric layers 11 in the capacity section 14 is 0.02 or more and 0.10 or less. The Eu/Ti atomic concentration ratio of the dielectric layers 11 in the capacity section 14 is 0.001 or more and 0.03 or less. The Mn/Ti atomic concentration ratio of the dielectric layers 11 in the capacity section 14 is 0.005 or more and 0.05 or less. The total atomic concentration of other rare elements is smaller than the atomic concentration of Eu. The median diameter of the plurality of crystal grains is 200 nm or more and 400 nm or less. With the structure, it is possible to achieve both the long lifetime and the excellent capacity temperature characteristic.

Figure 5:
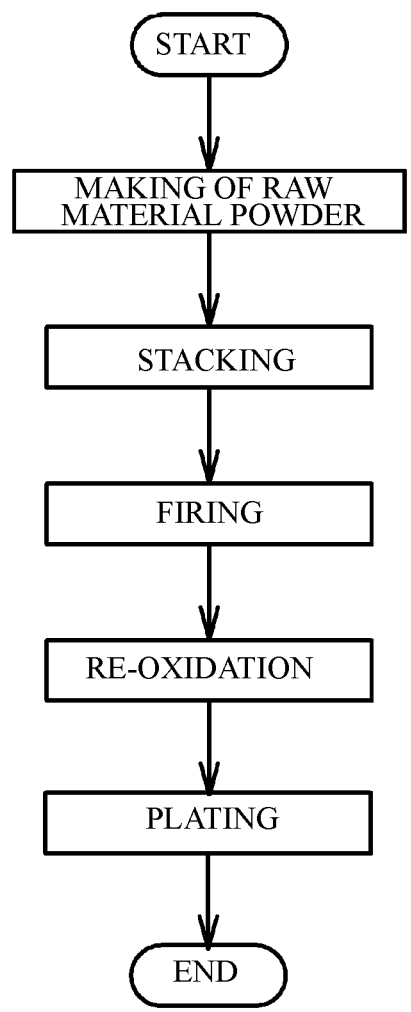
FIG. 5 is a flowchart of a method of manufacturing a multilayer ceramic capacitor.

Next, the manufacturing method of the multilayer ceramic capacitor 100 will be described. FIG. 5 is a flowchart of the manufacturing method of the multilayer ceramic capacitor 100.

[Making of Raw Material Powder]

A dielectric material for forming the dielectric layer 11 is prepared. The A site element and the B site element contained in the dielectric layer 11 are contained in the dielectric layer 11 typically in the form of a sintered compact of $ABO_3$ particles. For example, $BaTiO_3$ is a tetragonal compound having a perovskite structure, and exhibits high dielectric constant. This $BaTiO_3$ can be obtained typically by reacting a titanium raw material such as titanium dioxide with a barium raw material such as barium carbonate to synthesize barium titanate. Various methods have been known as a synthesizing method of ceramic constituting the dielectric layer 11. For example, the solid phase method, the sol-gel method, the hydrothermal method, and the like are known. Any one of the above methods can be employed in the present embodiment.

Additive compound is added to the resulting ceramic powder in accordance with purposes. The additive compound may be an oxide of Zr, Mg, Mn, V (vanadium), Cr (chromium) or Eu or an oxide of Co (cobalt), Ni, Li (lithium), B (boron), Na (sodium), K (potassium) or Si (silicon), or glass. If necessary, an oxide of a rare earth element other than Eu. The rare earth element is such as Sc (scandium), Y, La (lanthanum), Ce (cerium), Pr (praseodymium), Nd (neodymium), Pm (promethium), Sm (samarium), Gd (gadolinium), Tb (terbium), Dy, Ho Er (erbium), Tm (thulium), Yb, or Lu (lutetium).

For example, a compound including an additive is wet-blended with the resulting ceramic material powder. The resulting ceramic material powder is dried and crushed. For example, the resulting ceramic material is crushed if necessary. Thus, a particle diameter is adjusted. Alternatively, the particle diameter may be further adjusted by a classification process. Thus, a dielectric material is obtained. The Zr/Ti atomic concentration ratio of the dielectric material is 0.02 or more and 0.10 or less. The Eu/Ti atomic concentration ratio of the dielectric material is 0.001 or more and 0.03 or less. The Mn/Ti atomic concentration ratio of the dielectric material is 0.005 or more and 0.05 or less. The total atomic concentration of other rare elements is smaller than the atomic concentration of Eu.

[Stacking Process]

Next, a binder such as polyvinyl butyral (PVB) resin, an organic solvent such as ethanol or toluene, and a plasticizer are added to the resulting dielectric material and wet-blended. With use of the resulting slurry, a strip-shaped dielectric green sheet with a thickness of, for example, 0.5 μm or more is painted on a base material by, for example, a die coater method or a doctor blade method, and then dried.

Next, an internal electrode layer pattern is formed on the surface of the dielectric green sheet by printing a metal conductive paste for forming the internal electrode with use of screen printing or gravure printing. The metal conductive paste for forming the internal electrode contains an organic binder. A plurality of internal electrode layer patterns are alternately exposed to a pair of external electrodes. Ceramic particles are added as a co-material to the metal conductive paste. The main component of the ceramic particles is not particularly limited, but is preferably the same as the main component ceramic of the dielectric layer 11. For example, $BaTiO_3$ of which an average grain diameter is 50 nm or less may be evenly dispersed.

After that, the dielectric green sheet on which the internal electrode layer pattern is printed is stamped into a predetermined size, and a predetermined number (for example, 100 to 1000) of stamped dielectric green sheets are stacked while the base material is peeled so that the internal electrode layers 12 and the dielectric layers 11 are alternated with each other and the end edges of the internal electrode layers 12 are alternately exposed to both edge faces in the length direction of the dielectric layer so as to be alternately led out to a pair of external electrodes of different polarizations. Cover sheets to be the cover layers 13 are clamped on the upper face and the lower face of the stacked dielectric green sheets in the stacking direction. And, the resulting multilayer structure is cut into a predetermined chip size (for example, 1.0 mm×0.5 mm).

[Firing Process]

The binder is removed from the resulting ceramic multilayer structure in $N_2$ atmosphere. After that, Ni paste to be the base layer of the external electrodes 20a and 20b is painted by a dipping method. The resulting ceramic multilayer structure is fired in a reducing atmosphere with an oxygen partial pressure of $10^{-12}$ to $10^{-9}$ MPa in a temperature range of 1160° C. to 1280° C. for 5 minutes to 10 minutes.

When a temperature elevation rate is low such as 10° C./h, the diffusion of the rare earth element is excessively promoted, and an all solid solution grain is formed. In this case, the long lifetime is achieved. However, the dielectric constant may become lower, the sintering stability may be degraded and temperature characteristic of the capacity may be degraded. Accordingly, in the embodiment, the temperature elevation rate is 5000° C./h or more and 10000° C./h or less (for example, 6000° C./h). It is therefore possible to suppress the diffusion of Zr and form the core-shell structure of which the concentration gradient of Zr is large.

The median diameter of the crystal grains 17 is adjusted to 200 nm or more and 400 nm or less in the dielectric layers 11 in the capacity section 14 obtained by the firing process, by adjusting the firing process such as the particle diameter of the barium titanate, the firing temperature, the firing time or the like.

[Re-Oxidation Process]

In order to return the oxygen into the barium titanate acting as the main phase of the dielectric layers 11 which are fired in the reductive atmosphere and is partially reduced, a thermal process may be performed in a mixed gas of $N_2$ and moisture at approximately 1000 degrees C. or in a normal atmosphere at 500 degrees C. to 700 degrees C. so that the internal electrode layers 12 are not oxidized. The process is called a re-oxidation process.

[Plating Process]

After that, metal layers such as Cu, Ni, Sn or the like may be formed on the base layers of the external electrodes 20a and 20b by plating. With the processes, the multilayer ceramic capacitor 100 is fabricated.

EXAMPLES

The multilayer ceramic capacitors in accordance with the embodiment were made. And, property of the multilayer ceramic capacitors was measured.

(Example 1) $BaTiO_3$ powder was prepared as a dielectric material. Additives such as $ZrO_2$, $MnCO_3$, and Eu oxide were added to the $BaTiO_3$ powder. The dielectric material and the additives were mixed and crushed with use of zirconia bead of φ of 0.5 mm. Thus, the dielectric material was obtained. The Zr/Ti atomic concentration ratio was 0.04. The Eu/Ti atomic concentration ratio was 0.01. The Mn/Ti atomic concentration ratio was 0.03. No rare earth element other than Eu was added to the dielectric material. A binder was added to the resulting dielectric material. With use of the resulting slurry, dielectric green sheets were made. An internal electrode pattern of Ni paste was printed on each of the dielectric green sheets. Sheet members in which the internal electrode pattern was printed on the dielectric green sheet were stacked. The multilayer structure was cut into a 1005 shape. Thus, a ceramic multilayer structure of the 1005 shape was formed. The temperature of the ceramic multilayer structure was elevated to 1230° C. at a temperature elevation rate of 6000° C./h. In this manner, a high speed firing was performed. In order to reduce the amount of the oxygen vacancy formed in the reductive firing, the multilayer ceramic capacitor after the firing was subjected to the re-oxidation process at 1000° C. in a nitrogen atmosphere.

The thickness of each of the dielectric layers after the firing was 2.0 μm. Each sample was grinded so that the cross section of FIG. 6 was exposed by a grinder. An image of the cross section was observed by a SEM (Scanning Electron Microscope). The thicknesses were measured in each 20 positions of the image from different five fields of view. An average of the thicknesses of 100 positions was calculated as the thickness of the dielectric layers.

Figure 6:
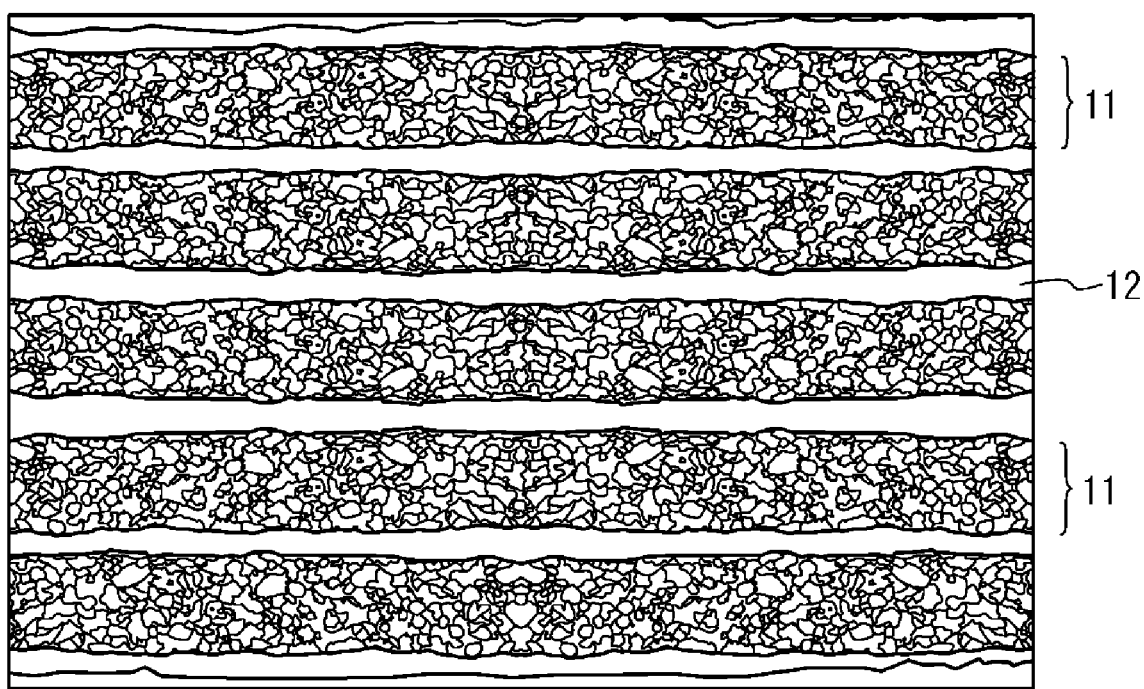
FIG. 6 illustrates a SEM image of a cross section of a stacked structure of dielectric layers and internal electrode layers in a capacity section of an example 1.

FIG. 6 illustrates the SEM image of the cross section of the stacked structure of the dielectric layers 11 and the internal electrode layers 12 in the capacity section. As illustrated in FIG. 6, the crystal grain diameters in the dielectric layers 11 in the capacity section was approximately uniform. It is thought that this was because the Zr/Ti atomic concentration ratio was 0.02 or more and 0.10 or less, and the abnormal grain growth was suppressed. The median diameter of the crystal grains in the dielectric layers 11 in the capacity section was 200 nm. Each sample was grinded so that the cross section of FIG. 6 was exposed by a grinder. An image of the cross section was observed by a SEM (Scanning Electron Microscope). The diameter was measured in each 100 crystal grains of the image from different five fields of view. The median diameter was calculated from the 500 diameters.

Figure 7:
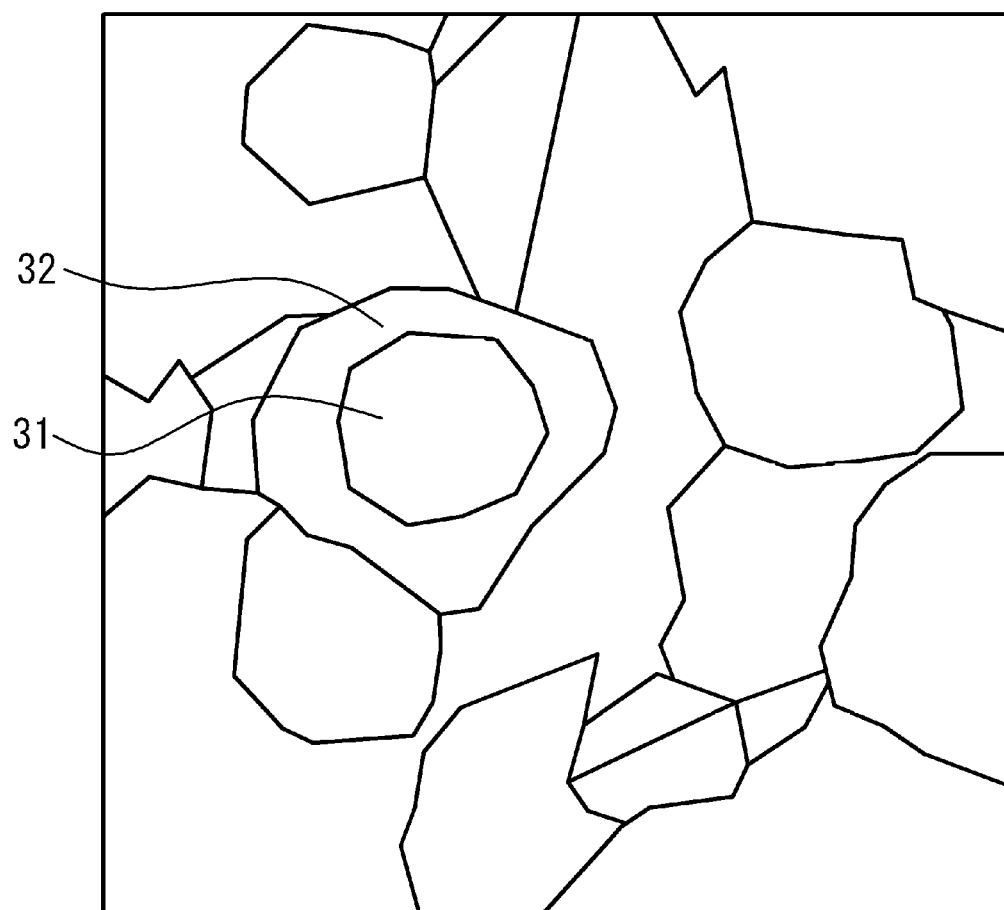
FIG. 7 illustrates a TEM image of dielectric layers in a capacity section.
Figure 8A:
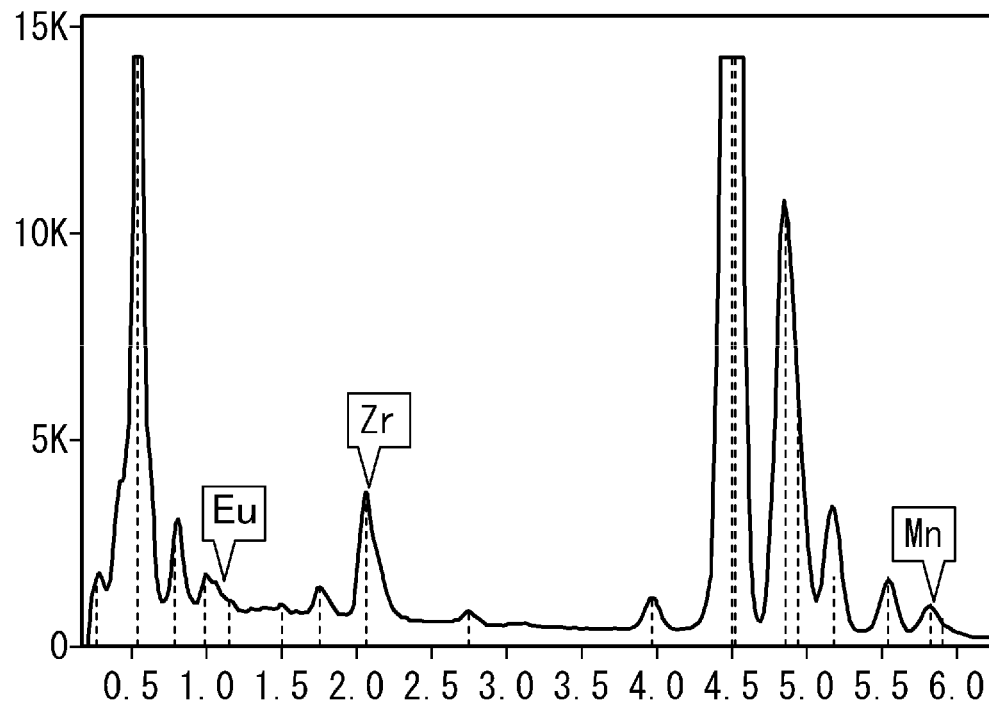
FIG. 8A illustrates a measured result of TEM-EDS analysis with respect to a shell.
Figure 8B:
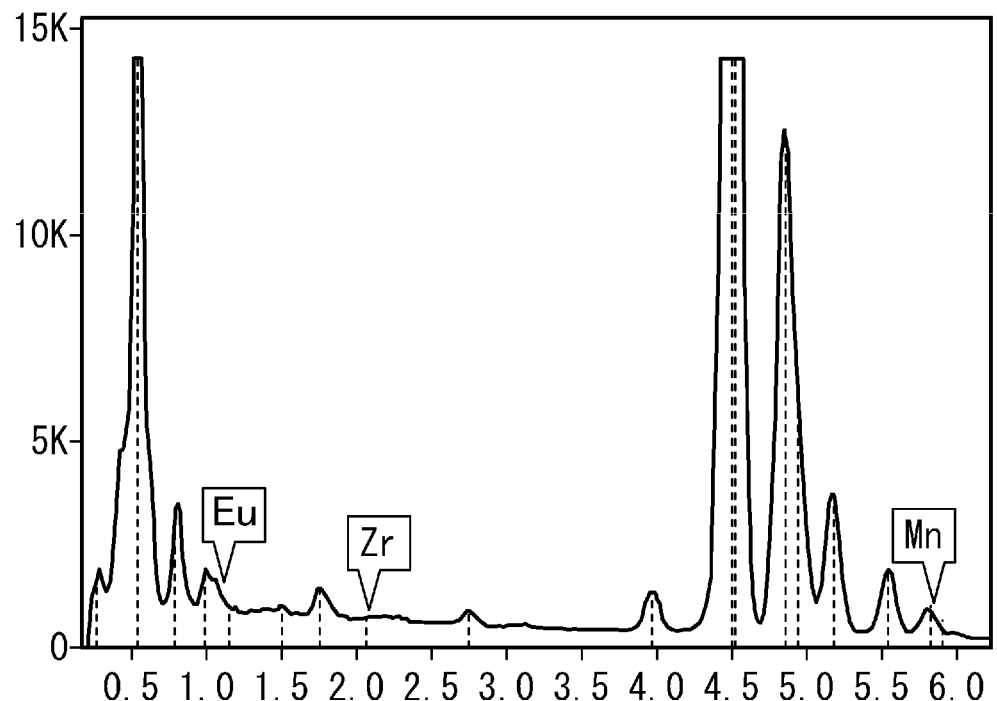
FIG. 8B illustrates a measured result of TEM-EDS analysis with respect to a core.

FIG. 7 illustrates a TEM (Transmission Electron Microscope) image of the dielectric layers in the capacity section. As illustrated in FIG. 7, the core 31 and the shell 32 surrounding the core 31 were observed in the dielectric layers in the capacity section after the firing. FIG. 8A illustrates a measured result of the TEM-EDS (Energy Dispersive X-ray Spectroscopy) analysis with respect to the shell 32. FIG. 8B illustrates a measured result of the TEM-EDS analysis with respect to the core 31. As illustrated in FIG. 8A and FIG. 8B, the Zr concentration of the shell 32 was higher than that of the core 31. Eu was observed in the core 31.

The X8R characteristic was measured in a range from −55° C. to 150° C. at 1 kHz and 0.5 Vrms. The dielectric constant was calculated from the capacity at 25° C., the thickness of the dielectric layers, and the electrode area. The accelerated lifetime with respect to each of 20 samples was tested at 170° C. and 125 V until the 20 samples were broken down. An average of the accelerated lifetimes was calculated as a lifetime. Table 2 and Table 3 show the dielectric constant, the accelerated lifetime, and the evaluation result of the X8R characteristic. When a relative dielectric constant ε of a sample was 1500 or more, the relative dielectric constant ε of the sample was determined as good "○". When the relative dielectric constant ε of a sample was less than 1500, the relative dielectric constant ε of the sample was determined as bad "×". When an accelerated lifetime of a sample was 3000 min or more, the accelerated lifetime of the sample was determined as good "○". When the accelerated lifetime of a sample was less than 3000 min, the accelerated lifetime of the sample was determined as bad "×". When a sample satisfied the X8R characteristic, the temperature characteristic of the sample was determined as good "○". When a sample did not satisfy the X8R characteristic, the temperature characteristic of the sample was determined as bad "×". When the three items of a sample were determined as good, a total determination of the sample was evaluated as good "○". When at least one of the three items of a sample was determined as bad, the total determination of the sample was evaluated as bad "×".

The total determination of the example 1 was evaluated as good "○". It is thought that this was because: at least one of the crystal grains of the dielectric layers in the capacity section had the core-shell structure having the core and the shell; the main component of the core was barium titanate; the main component of the shell was barium titanate; the Zr concentration of the shell was higher than that of the core; the Zr/Ti atomic concentration ratio of the dielectric layers in the capacity section was 0.02 or more and 0.10 or less; the Eu/Ti atomic concentration ratio of the dielectric layers 11 in the capacity section 14 was 0.001 or more and 0.03 or less; the Mn/Ti atomic concentration ratio of the dielectric layers 11 in the capacity section 14 was 0.005 or more and 0.05 or less; the total atomic concentration of other rare elements was smaller than the atomic concentration of Eu; the median diameter of the plurality of crystal grains was 200 nm or more and 400 nm or less; and the long lifetime and the excellent capacity temperature characteristic were achieved.

(Comparative example 1) In a comparative example 1, Yb was used instead of Eu. Other conditions were the same as those of the example 1.

(Comparative example 2) In a comparative example 2, Ho was used instead of Eu. Other conditions were the same as those of the example 1.

(Comparative example 3) In a comparative example 3, Dy was used instead of Eu. Other conditions were the same as those of the example 1.

(Comparative example 4) In a comparative example 4, Tb was used instead of Eu. Other conditions were the same as those of the example 1.

(Comparative example 5) In a comparative example 5, Gd was used instead of Eu. Other conditions were the same as those of the example 1.

(Comparative example 6) In a comparative example 6, Nd was used instead of Eu. Other conditions were the same as those of the example 1.

(Comparative example 7) In a comparative example 7, Pr was used instead of Eu. Other conditions were the same as those of the example 1.

(Comparative example 8) In a comparative example 8, Ce was used instead of Eu. Other conditions were the same as those of the example 1.

(Comparative example 9) In a comparative example 9, La was used instead of Eu. Other conditions were the same as those of the example 1.

The relative dielectric constant, the accelerated lifetime, and the X8R characteristic were tested with respect to each of the comparative examples 1 to 9, as well as the example 1. And the total determination of each of the comparative examples 1 to 9 was evaluated. Each of the accelerated lifetime of the comparative examples 1 to 9 was determined as bad. It is thought that this was because the rare earth element was used instead of Eu. The comparative examples 2 to 9 did not satisfy the X8R characteristic. It is thought that this was because the rare earth element was used instead of Eu.

(Comparative example 10) In a comparative example 10, the median diameter of the crystal grains in the dielectric layers in the capacity section was adjusted to 100 nm by adjusting the firing conditions or the like. Other conditions were the same as those of the example 1.

(Example 2) In an example 2, the median diameter of the crystal grains in the dielectric layers in the capacity section was adjusted to 300 nm by adjusting the firing condition or the like. Other conditions were the same as those of the example 1.

(Example 3) In an example 3, the median diameter of the crystal grains in the dielectric layers in the capacity section was adjusted to 400 nm by adjusting the firing process or the like. Other conditions were the same as those of the example 1.

(Comparative example 11) In a comparative example 11, the median diameter of the crystal grains in the dielectric layers in the capacity section was adjusted to 500 nm by adjusting the firing conditions or the like. Other conditions were the same as those of the example 1.

The relative dielectric constant, the accelerated lifetime, and the X8R characteristic were tested with respect to each of the examples 2 and 3 and the comparative examples 10 and 11, as well as the example 1. And the total determination of each of the examples 2 and 3 and the comparative examples 10 and 11 was evaluated. The total determination of the examples 2 and 3 was evaluated as good "○". It is thought that this was because: at least one of the crystal grains of the dielectric layers in the capacity section had the core-shell structure having the core and the shell; the main component of the core was barium titanate; the main component of the shell was barium titanate; the Zr concentration of the shell was higher than that of the core; the Zr/Ti atomic concentration ratio of the dielectric layers in the capacity section was 0.02 or more and 0.10 or less; the Eu/Ti atomic concentration ratio of the dielectric layers 11 in the capacity section 14 was 0.001 or more and 0.03 or less; the Mn/Ti atomic concentration ratio of the dielectric layers 11 in the capacity section 14 was 0.005 or more and 0.05 or less; the total atomic concentration of other rare elements was smaller than the atomic concentration of Eu; the median diameter of the plurality of crystal grains was 200 nm or more and 400 nm or less; and the long lifetime and the excellent capacity temperature characteristic were achieved. In contrast, each of the temperature characteristic of the comparative examples 10 and 11 was determined as bad. It is thought that this was because the median diameter of the crystal grains of the dielectric layers in the capacity section was less than 200 nm or more than 400 nm, and the changing rate of the capacity at a high temperature became large.

(Comparative example 12) In a comparative example 12, the Zr/Ti atomic concentration ratio was 0.01. The median diameter of the crystal grains in the dielectric layers in the capacity section was adjusted to 800 nm by adjusting the firing conditions or the like. Other conditions were the same as those of the example 1.

(Example 4) In an example 4, the Zr/Ti atomic concentration ratio was 0.02. Other conditions were the same as those of the example 1.

(Example 5) In an example 5, the Zr/Ti atomic concentration ratio was 0.06. Other conditions were the same as those of the example 1.

(Example 6) In an example 6, the Zr/Ti atomic concentration ratio was 0.08. Other conditions were the same as those of the example 1.

(Example 7) In an example 7, the Zr/Ti atomic concentration ratio was 0.10. Other conditions were the same as those of the example 1.

(Comparative example 13) In a comparative example 13, the Zr/Ti atomic concentration ratio was 0.20. Other conditions were the same as those of the example 1.

Figure 9:
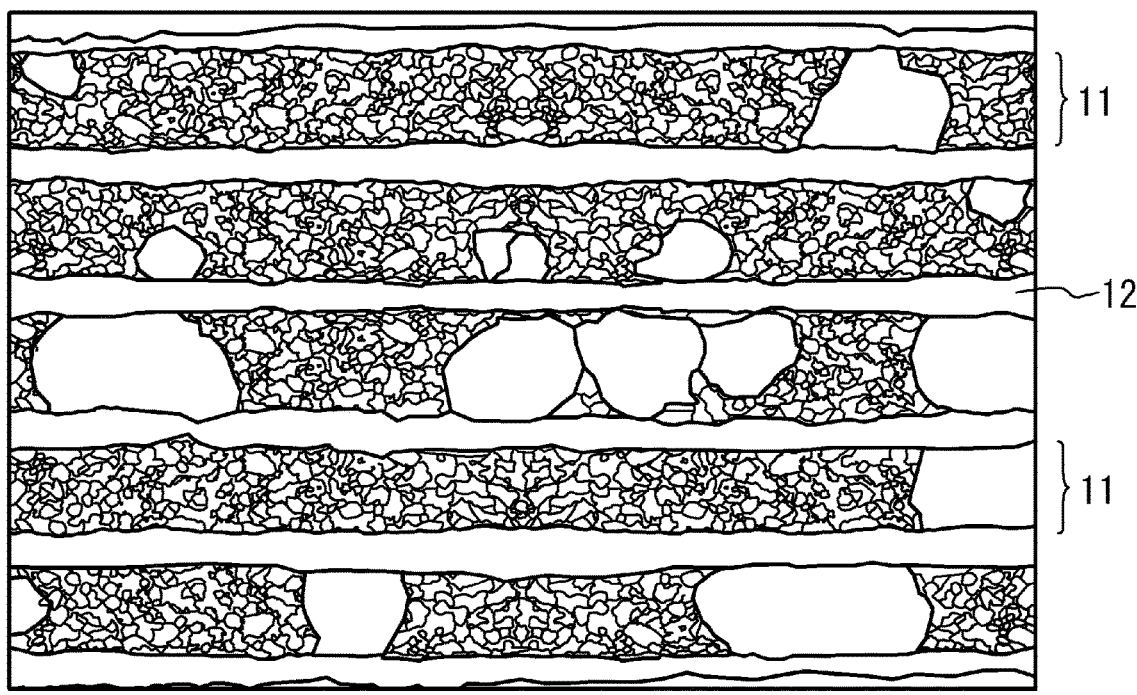
FIG. 9 illustrates a SEM image of a cross section of a comparative example 12 along a stacking direction of dielectric layers and internal electrode layers in a capacity section.

The relative dielectric constant, the accelerated lifetime, and the X8R characteristic were tested with respect to each of the examples 4 to 7 and the comparative examples 12 and 13, as well as the example 1. And the total determination of each of the examples 4 to 7 and the comparative examples 12 and 13 was evaluated. The total determination of the examples 4 to 7 was evaluated as good "○". It is thought that this was because: at least one of the crystal grains of the dielectric layers in the capacity section had the core-shell structure having the core and the shell; the main component of the core was barium titanate; the main component of the shell was barium titanate; the Zr concentration of the shell was higher than that of the core; the Zr/Ti atomic concentration ratio of the dielectric layers in the capacity section was 0.02 or more and 0.10 or less; the Eu/Ti atomic concentration ratio of the dielectric layers 11 in the capacity section 14 was 0.001 or more and 0.03 or less; the Mn/Ti atomic concentration ratio of the dielectric layers 11 in the capacity section 14 was 0.005 or more and 0.05 or less; the total atomic concentration of other rare elements was smaller than the atomic concentration of Eu; the median diameter of the plurality of crystal grains was 200 nm or more and 400 nm or less; and the long lifetime and the excellent capacity temperature characteristic were achieved. In contrast, the accelerated lifetime and the temperature characteristic of the comparative example 12 were determined as bad. It is thought that this was because the core-shell structure described on the basis of FIG. 4A and FIG. 4B was not maintained because of the low Zr concentration, a long lifetime was not achieved because of local abnormal grain growth, and the X8R characteristic was not satisfied. FIG. 9 illustrates a SEM image of a cross section of the comparative example 12 along a stacking direction of the dielectric layers 11 and the internal electrode layers 12 in the capacity section. As illustrated in FIG. 9, it was confirmed that the abnormal grain growth occurred in the dielectric layers in the capacity section. The relative dielectric constant and the temperature characteristic of the comparative example 13 were determined as bad. It is thought that this was because the relative dielectric constant was reduced because of the high Zr concentration.

(Comparative example 14) In a comparative example 14, the Eu/Ti atomic concentration ratio was 0.0005. Other conditions were the same as those of the example 1.

(Example 8) In an example 8, the Eu/Ti atomic concentration ratio was 0.001. Other conditions were the same as those of the example 1.

(Example 9) In an example 9, the Eu/Ti atomic concentration ratio was 0.005. Other conditions were the same as those of the example 1.

(Example 10) In an example 10, the Eu/Ti atomic concentration ratio was 0.02. Other conditions were the same as those of the example 1.

(Example 11) In an example 11, the Eu/Ti atomic concentration ratio was 0.03. Other conditions were the same as those of the example 1.

(Comparative example 15) In a comparative example 15, the Eu/Ti atomic concentration ratio was 0.04. Other conditions were the same as those of the example 1.

The relative dielectric constant, the accelerated lifetime, and the X8R characteristic were tested with respect to each of the examples 8 to 11 and the comparative examples 14 and 15, as well as the example 1. And the total determination of each of the examples 8 to 11 and the comparative examples 14 and 15 was evaluated. The total determination of the examples 8 to 11 was evaluated as good "○". It is thought that this was because: at least one of the crystal grains of the dielectric layers in the capacity section had the core-shell structure having the core and the shell; the main component of the core was barium titanate; the main component of the shell was barium titanate; the Zr concentration of the shell was higher than that of the core; the Zr/Ti atomic concentration ratio of the dielectric layers in the capacity section was 0.02 or more and 0.10 or less; the Eu/Ti atomic concentration ratio of the dielectric layers 11 in the capacity section 14 was 0.001 or more and 0.03 or less; the Mn/Ti atomic concentration ratio of the dielectric layers 11 in the capacity section 14 was 0.005 or more and 0.05 or less; the total atomic concentration of other rare elements was smaller than the atomic concentration of Eu; the median diameter of the plurality of crystal grains was 200 nm or more and 400 nm or less; and the long lifetime and the excellent capacity temperature characteristic were achieved. In contrast, the accelerated lifetime of the comparative example 14 was determined as bad. It is thought that this was because the added amount of Eu was small, and sufficient long lifetime was not achieved. The accelerated lifetime of the comparative example 15 was determined as bad. It is thought that this was because the added amount of Eu was large, and long lifetime was not achieved because of formation of semiconductor.

(Comparative example 16) In a comparative example 16, the Mn/Ti atomic concentration ratio was 0.001. Other conditions were the same as those of the example 1.

(Example 12) In an example 12, the Mn/Ti atomic concentration ratio was 0.005. Other conditions were the same as those of the example 1.

(Example 13) In an example 13, the Mn/Ti atomic concentration ratio was 0.01. Other conditions were the same as those of the example 1.

(Example 14) In an example 14, the Mn/Ti atomic concentration ratio was 0.02. Other conditions were the same as those of the example 1.

(Example 15) In an example 15, the Mn/Ti atomic concentration ratio was 0.05. Other conditions were the same as those of the example 1.

(Comparative example 17) In a comparative example 17, the Mn/Ti atomic concentration ratio was 0.1. Other conditions were the same as those of the example 1.

The relative dielectric constant, the accelerated lifetime, and the X8R characteristic were tested with respect to each of the examples 12 to 15 and the comparative examples 16 and 17, as well as the example 1. And the total determination of each of the examples 12 to 15 and the comparative examples 16 and 17 was evaluated. The total determination of the examples 12 to 15 was evaluated as good "○". It is thought that this was because: at least one of the crystal grains of the dielectric layers in the capacity section had the core-shell structure having the core and the shell; the main component of the core was barium titanate; the main component of the shell was barium titanate; the Zr concentration of the shell was higher than that of the core; the Zr/Ti atomic concentration ratio of the dielectric layers in the capacity section was 0.02 or more and 0.10 or less; the Eu/Ti atomic concentration ratio of the dielectric layers 11 in the capacity section 14 was 0.001 or more and 0.03 or less; the Mn/Ti atomic concentration ratio of the dielectric layers 11 in the capacity section 14 was 0.005 or more and 0.05 or less; the total atomic concentration of other rare elements was smaller than the atomic concentration of Eu; the median diameter of the plurality of crystal grains was 200 nm or more and 400 nm or less; and the long lifetime and the excellent capacity temperature characteristic were achieved. In contrast, the accelerated lifetime of the comparative example 16 was determined as bad. It is thought that this was because the amount of acceptors was small, and a semiconductor was formed in the dielectric layers. The accelerated lifetime of the comparative example 17 was determined as bad. It is thought that this was because the amount of the acceptors was excessive.

TABLE 2

| | BT GRAIN DIAMETER (nm) | Zr/Ti | RARE EARTH | /Ti | Mn/Ti |
|---|---|---|---|---|---|
| EXAMPLE 1 | 200 | 0.04 | Eu | 0.01 | 0.03 |
| COMPARATIVE EXAMPLE 1 | 200 | 0.04 | Yb | 0.01 | 0.03 |
| COMPARATIVE EXAMPLE 2 | 200 | 0.04 | Ho | 0.01 | 0.03 |
| COMPARATIVE EXAMPLE 3 | 200 | 0.04 | Dy | 0.01 | 0.03 |
| COMPARATIVE EXAMPLE 4 | 200 | 0.04 | Tb | 0.01 | 0.03 |
| COMPARATIVE EXAMPLE 5 | 200 | 0.04 | Gd | 0.01 | 0.03 |
| COMPARATIVE EXAMPLE 6 | 200 | 0.04 | Nd | 0.01 | 0.03 |
| COMPARATIVE EXAMPLE 7 | 200 | 0.04 | Pr | 0.01 | 0.03 |
| COMPARATIVE EXAMPLE 8 | 200 | 0.04 | Ce | 0.01 | 0.03 |
| COMPARATIVE EXAMPLE 9 | 200 | 0.04 | La | 0.01 | 0.03 |
| COMPARATIVE EXAMPLE 10 | 100 | 0.04 | Eu | 0.01 | 0.03 |
| EXAMPLE 2 | 300 | 0.04 | Eu | 0.01 | 0.03 |
| EXAMPLE 3 | 400 | 0.04 | Eu | 0.01 | 0.03 |
| COMPARATIVE EXAMPLE 11 | 500 | 0.04 | Eu | 0.01 | 0.03 |
| COMPARATIVE EXAMPLE 12 | 200 | 0.01 | Eu | 0.01 | 0.03 |
| EXAMPLE 4 | 200 | 0.02 | Eu | 0.01 | 0.03 |
| EXAMPLE 5 | 200 | 0.06 | Eu | 0.01 | 0.03 |
| EXAMPLE 6 | 200 | 0.08 | Eu | 0.01 | 0.03 |
| EXAMPLE 7 | 200 | 0.10 | Eu | 0.01 | 0.03 |
| COMPARATIVE EXAMPLE 13 | 200 | 0.20 | Eu | 0.01 | 0.03 |
| COMPARATIVE EXAMPLE 14 | 200 | 0.04 | Eu | 0.0005 | 0.03 |
| EXAMPLE 8 | 200 | 0.04 | Eu | 0.001 | 0.03 |
| EXAMPLE 9 | 200 | 0.04 | Eu | 0.005 | 0.03 |
| EXAMPLE 10 | 200 | 0.04 | Eu | 0.02 | 0.03 |
| EXAMPLE 11 | 200 | 0.04 | Eu | 0.03 | 0.03 |
| COMPARATIVE EXAMPLE 15 | 200 | 0.04 | Eu | 0.04 | 0.03 |
| COMPARATIVE EXAMPLE 16 | 200 | 0.04 | Eu | 0.01 | 0.001 |
| EXAMPLE 12 | 200 | 0.04 | Eu | 0.01 | 0.005 |
| EXAMPLE 13 | 200 | 0.04 | Eu | 0.01 | 0.01 |
| EXAMPLE 14 | 200 | 0.04 | Eu | 0.01 | 0.02 |
| EXAMPLE 15 | 200 | 0.04 | Eu | 0.01 | 0.05 |
| COMPARATIVE EXAMPLE 17 | 200 | 0.04 | Eu | 0.01 | 0.1 |
| COMPARATIVE EXAMPLE 18 | 200 | 0.04 | Eu/Dy | 0.01/0.01 | 0.03 |
| EXAMPLE 16 | 400 | 0.02 | Eu | 0.01 | 0.05 |
| EXAMPLE 17 | 200 | 0.10 | Eu | 0.03 | 0.05 |

TABLE 3

| | RELATIVE DIELECTRIC CONSTANT | LIFETIME (min) | TEMPERATURE CHARACTERISTIC | TOTAL EVALUATION |
|---|---|---|---|---|
| EXAMPLE 1 | 2100 | 6000 | ○ | ○ |
| COMPARATIVE EXAMPLE 1 | 1900 | 310 | ○ | x |
| COMPARATIVE EXAMPLE 2 | 2050 | 260 | x | x |
| COMPARATIVE EXAMPLE 3 | 2070 | 340 | x | x |
| COMPARATIVE EXAMPLE 4 | 2080 | 250 | x | x |
| COMPARATIVE EXAMPLE 5 | 2090 | 120 | x | x |
| COMPARATIVE EXAMPLE 6 | 2150 | 0 | x | x |
| COMPARATIVE EXAMPLE 7 | 2160 | 0 | x | x |
| COMPARATIVE EXAMPLE 8 | 2170 | 40 | x | x |
| COMPARATIVE EXAMPLE 9 | 2180 | 70 | x | x |
| COMPARATIVE EXAMPLE 10 | 1600 | 7100 | x | x |
| EXAMPLE 2 | 2350 | 5500 | ○ | ○ |
| EXAMPLE 3 | 2600 | 5000 | ○ | ○ |
| COMPARATIVE EXAMPLE 11 | 3000 | 4000 | x | x |
| COMPARATIVE EXAMPLE 12 | 4000 | 0 | x | x |
| EXAMPLE 4 | 2500 | 4200 | ○ | ○ |
| EXAMPLE 5 | 2300 | 6200 | ○ | ○ |
| EXAMPLE 6 | 2000 | 6500 | ○ | ○ |
| EXAMPLE 7 | 1600 | 7000 | ○ | ○ |
| COMPARATIVE EXAMPLE 13 | 1000 | 7300 | x | x |
| COMPARATIVE EXAMPLE 14 | 1800 | 500 | ○ | x |
| EXAMPLE 8 | 1900 | 3000 | ○ | ○ |
| EXAMPLE 9 | 2000 | 4000 | ○ | ○ |
| EXAMPLE 10 | 2300 | 6500 | ○ | ○ |
| EXAMPLE 11 | 2400 | 7500 | ○ | ○ |

TABLE 3-continued

| | RELATIVE DIELECTRIC CONSTANT | LIFETIME (min) | TEMPERATURE CHARACTERISTIC | TOTAL EVALUATION |
|---|---|---|---|---|
| COMPARATIVE EXAMPLE 15 | 0 | 0 | x | x |
| COMPARATIVE EXAMPLE 16 | 0 | 0 | x | x |
| EXAMPLE 12 | 2400 | 3000 | ○ | ○ |
| EXAMPLE 13 | 2350 | 4000 | ○ | ○ |
| EXAMPLE 14 | 2250 | 5500 | ○ | ○ |
| EXAMPLE 15 | 2000 | 3000 | ○ | ○ |
| COMPARATIVE EXAMPLE 17 | 1800 | 500 | x | x |
| COMPARATIVE EXAMPLE 18 | 2100 | 1100 | x | x |
| EXAMPLE 16 | 3000 | 4000 | ○ | ○ |
| EXAMPLE 17 | 1700 | 5500 | ○ | ○ |

Although the embodiments of the present invention have been described in detail, it is to be understood that the various change, substitutions, and alterations could be made hereto without departing from the spirit and scope of the invention.

What is claimed is:

1. A dielectric body comprising:
a plurality of crystal grains of which a main component is barium titanate; and
an additive including Zr, Eu and Mn,
wherein at least one of the plurality of crystal grains has a core-shell structure having a core and a shell, a main component of the core being barium titanate, a main component of the shell being barium titanate, a Zr concentration of the shell being higher than that of the core,
wherein a Zr/Ti atomic concentration ratio is 0.02 or more and 0.10 or less,
wherein an Eu/Ti atomic concentration ratio is 0.001 or more and 0.03 or less,
wherein a Mn/Ti atomic concentration ratio is 0.005 or more and 0.05 or less,
wherein the dielectric body has one or more rare earth elements other than Eu, or does not have any rare earth element other than Eu,
wherein a total atomic concentration of the one or more rare elements is smaller than an atomic concentration of Eu when the dielectric body has the one or more rare earth elements,
wherein a median diameter of the plurality of crystal grains is 200 nm or more and 400 nm or less.

2. The dielectric body as claimed in claim 1, wherein a rare earth element of the additive is only Eu.

3. A multilayer ceramic capacitor comprising:
a multilayer structure having a structure in which each of a plurality of dielectric layers and each of a plurality of internal electrode layers are alternately stacked and having a substantially rectangular parallelepiped shape,
wherein each of the plurality of internal electrode layers are alternately exposed to each of two different faces of the rectangular parallelepiped shape,
wherein a section in which internal electrode layers exposed to the two different faces face each other is a capacity section,
wherein dielectric layers in the capacity section have a plurality of crystal grains of which a main component is barium titanate and an additive including Zr, Eu and Mn,
wherein at least one of the plurality of crystal grains has a core-shell structure having a core and a shell, a main component of the core being barium titanate, a main component of the shell being barium titanate, a Zr concentration of the shell being higher than that of the core,
wherein a Zr/Ti atomic concentration ratio of the dielectric layers in the capacity section is 0.02 or more and 0.10 or less,
wherein an Eu/Ti atomic concentration ratio of the dielectric layers in the capacity section is 0.001 or more and 0.03 or less,
wherein a Mn/Ti atomic concentration ratio of the dielectric layers in the capacity section is 0.005 or more and 0.05 or less,
wherein the dielectric layers in the capacity section has one or more rare earth elements other than Eu, or does not have any rare earth element other than Eu,
wherein a total atomic concentration of the one or more rare elements is smaller than an atomic concentration of Eu when of the dielectric layers in the capacity section has the one or more rare earth elements,
wherein a median diameter of the plurality of crystal grains is 200 nm or more and 400 nm or less.

4. The multilayer ceramic capacitor as claimed in claim 3, wherein X8R characteristic is satisfied.

5. A manufacturing method of a dielectric body comprising:
forming a dielectric body by firing a dielectric green sheet at a temperature elevation rate of 5000° C./h or more and 10000° C./h or less,
wherein the dielectric green sheet includes barium titanate powder and an additive including Zr, Eu and Mn,
wherein a Zr/Ti atomic concentration ratio in the dielectric green sheet is 0.02 or more and 0.10 or less,
wherein an Eu/Ti atomic concentration ratio in the dielectric green sheet is 0.001 or more and 0.03 or less,
wherein a Mn/Ti atomic concentration ratio in the dielectric green sheet is 0.005 or more and 0.05 or less,
wherein the dielectric green sheet has one or more rare earth elements other than Eu, or does not have any rare earth element other than Eu,
wherein a total atomic concentration of the one or more rare elements in the dielectric green sheet is smaller than an atomic concentration of Eu in the dielectric green sheet when the dielectric green sheet has the one or more rare earth elements, wherein the dielectric body includes a plurality of crystal grains of which a main component is barium titanate, wherein a median diameter of the plurality of crystal grains is 200 nm or more and 400 nm or less.

6. A manufacturing method of a multilayer ceramic capacitor comprising:

forming a ceramic multilayer structure by stacking stack units in which metal conductive paste is printed on a dielectric green sheet including barium titanate powder and an additive including Zr, Eu and Mn; and firing the ceramic multilayer structure at a temperature elevation rate of 5000° C./h or more and 10000° C./h or less so that dielectric layer are formed from the dielectric green sheet, wherein a Zr/Ti atomic concentration ratio in the dielectric green sheet is 0.02 or more and 0.10 or less, wherein an Eu/Ti atomic concentration ratio in the dielectric green sheet is 0.001 or more and 0.03 or less, wherein a Mn/Ti atomic concentration ratio in the dielectric green sheet is 0.005 or more and 0.05 or less, wherein the dielectric green sheet has one or more rare earth elements other than Eu, or does not have any rare earth element other than Eu, wherein a total atomic concentration of the one or more rare elements in the dielectric green sheet is smaller than an atomic concentration of Eu in the dielectric green sheet when the dielectric green sheet has the one or more rare earth elements, wherein the dielectric layers include a plurality of crystal grains of which a main component is barium titanate, wherein a median diameter of the plurality of crystal grains is 200 nm or more and 400 nm or less.

* * * * *